United States Patent
Bäckström et al.

(10) Patent No.: US 11,873,937 B2
(45) Date of Patent: Jan. 16, 2024

(54) PRESSURE TIGHT PLUG

(71) Applicant: MANN TEKNIK AB, Mariestad (SE)

(72) Inventors: Marcus Bäckström, Mariestad (SE); Fredrik Adamsson, Mariestad (SE)

(73) Assignee: MANN TEKNIK AB, Mariestad (SE)

( * ) Notice: Subject to any disclaimer, the term of this patent is extended or adjusted under 35 U.S.C. 154(b) by 509 days.

(21) Appl. No.: 17/276,878

(22) PCT Filed: Sep. 20, 2019

(86) PCT No.: PCT/SE2019/050900
§ 371 (c)(1),
(2) Date: Mar. 17, 2021

(87) PCT Pub. No.: WO2020/060476
PCT Pub. Date: Mar. 26, 2020

(65) Prior Publication Data
US 2022/0034439 A1 Feb. 3, 2022

(30) Foreign Application Priority Data
Sep. 21, 2018 (SE) .................... 1851130-3

(51) Int. Cl.
*F16L 55/11* (2006.01)
*B60K 15/035* (2006.01)
*B60K 15/04* (2006.01)

(52) U.S. Cl.
CPC .... *F16L 55/1125* (2013.01); *B60K 15/03519* (2013.01); *B60K 15/0409* (2013.01); *B60K 2015/03547* (2013.01)

(58) Field of Classification Search
CPC .... F16L 55/1125; F16L 55/1155; F16L 37/36; B60K 15/03519; B60K 15/0409;
(Continued)

(56) References Cited

U.S. PATENT DOCUMENTS 3,474,827 A * 10/1969 Rosell ................. F16L 37/36
137/614.03
3,537,283 A * 11/1970 Mross ............... B60K 15/0409
70/164
(Continued)

FOREIGN PATENT DOCUMENTS

DE 202009002948 U1 6/2009
JP 59-116665 U 8/1984
SE 534580 C2 10/2011

OTHER PUBLICATIONS

International Search Report, issued in PCT/SE2019/050900, dated Dec. 11, 2019.
(Continued)

*Primary Examiner* — Craig M Schneider
*Assistant Examiner* — Andrew J Rost
(74) *Attorney, Agent, or Firm* — Birch, Stewart, Kolasch & Birch, LLP

(57) ABSTRACT

A pressure tight plug for sealing a coupler of a dry disconnect valve includes a housing, a main flow valve, and at least one urging member being rotatable with respect to the housing of the coupler. The pressure tight plug includes a body, a locking ring, a pressure relief lock valve, and a pressure relief channel. The body includes an internal region for sealing adjacent the main flow valve of the coupler member, and a flanged perimeter for securing the plug to the coupler. The locking ring is receivable on, and rotatable with respect to, the body for engaging with the at least one urging member of the coupler. The pressure relief lock valve is fixed with respect to the body. The pressure relief channel extends from the internal region of the body to atmosphere, via said pressure relief lock valve. The pressure relief lock valve is arranged such that in a valve closed position the pressure relief lock valve is engaged with the locking ring,
(Continued)

therein restricting movement of the locking ring and therein fixing the plug to the coupler.

20 Claims, 4 Drawing Sheets

(58) Field of Classification Search
CPC ...... B60K 15/0406; B60K 2015/03547; B60K 2015/03335; B60K 2015/0438; B60K 2015/0458; F16J 13/24; B67D 7/0288
See application file for complete search history.

(56) References Cited

U.S. PATENT DOCUMENTS

| | | | | |
|---|---|---|---|---|
| 3,818,939 | A * | 6/1974 | Buseth | F16L 37/22 251/340 |
| 4,453,388 | A * | 6/1984 | Baker | B60K 15/0409 220/210 |
| 4,579,244 | A * | 4/1986 | Fukuta | B60K 15/0409 220/203.26 |
| 5,000,339 | A * | 3/1991 | Wheat | B60K 15/0409 220/203.07 |
| 5,183,173 | A | 2/1993 | Heckman | |
| 5,404,909 | A * | 4/1995 | Hanson | F16L 37/252 62/50.7 |
| 5,520,300 | A * | 5/1996 | Griffin | B60K 15/0409 220/210 |
| 5,671,777 | A * | 9/1997 | Allen | F16L 37/36 285/322 |
| 5,904,057 | A * | 5/1999 | Abney, III | B60K 15/0409 220/203.26 |
| 6,220,064 | B1 * | 4/2001 | Oddenino | B60K 15/0409 70/389 |
| 6,223,923 | B1 * | 5/2001 | Fishman | B60K 15/0409 220/86.2 |
| 2002/0117502 | A1 | 8/2002 | Smith | |
| 2012/0160849 | A1 | 6/2012 | Lang et al. | |
| 2013/0312838 | A1 | 11/2013 | McLain | |

OTHER PUBLICATIONS

Written Opinion of the International Searching Authority, issued in PCT/SE2019/050900, dated Dec. 11, 2019.

* cited by examiner

PRESSURE TIGHT PLUG

FIELD OF THE INVENTION

The present disclosure relates to a plug for a dry disconnect coupler. Specifically it relates to a pressure tight plug comprising a pressure relief locking valve.

BACKGROUND OF THE INVENTION

During the provision of fluid to fuel tanks, storage tanks, and the like, it is ideal if a minimum of the fluid being transferred is spilt or wasted during the process of connection and/or disconnection. This may be for safety reasons such as limiting the amount of flammable fuel present in a connection member and/or to limit waste for cost savings. One technique to reduce this spillage or wastage are dry disconnect valves. Like other valve systems dry disconnect couplings are used to connect fluid conduits to form a continuous fluid path.

The couplings generally comprise an adapter and a coupler. The adapter and the coupler are generally each provided with a valve, after or during connection of the adapter to the coupler, the valves are opened to form a continuous flow path through the dry disconnect valve. Prior to or during disconnection of the coupler from the adapter the valves are closed, either manually, or automatically via a valve biasing system. Generally, the adapter is provided on a tank-side relative the fluid path, and the coupler is provided on a hose-side. The coupler may be considered the female part of the assembly as it receives the adapter, the adapter being the male part of the assembly.

To ensure that the valves are protected from damage a cap may be placed over the end of the coupler and/or adapter. If the cap is pressure tight it may be considered a secondary or tertiary closure according to regulations relating to the transport of dangerous goods (e.g., UN ADR 2017, OTIF RID 2017). A pressure tight cap may be referred to as a plug. Traditionally such pressure tight caps or plugs have only been suitable for the tank-side adapter.

It would be ideal to have a pressure tight seal for a dry-disconnect coupler which protects the coupler from damage but meets all necessary safety regulations.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a pressure tight plug for sealing a coupler member of a dry disconnect valve, the coupler comprising a housing, a main flow valve, and at least one urging member being rotatable with respect to the housing of the coupler, the pressure tight plug comprising: a body, a locking ring, a pressure relief lock valve, and a pressure relief channel. The body comprises an internal region for sealing adjacent the main flow valve of the coupler member, and a flanged perimeter for securing the plug to the coupler. The locking ring is receivable on, and rotatable with respect to, the body for engaging with the at least one urging member of the coupler. The pressure relief lock valve is fixed with respect to the body. The pressure relief channel extends from the internal region of the body to atmosphere, via said pressure relief lock valve. The pressure relief lock valve is arranged such that in a valve closed position the pressure relief lock valve is engaged with the locking ring, therein restricting movement of the locking ring and therein fixing the plug to the coupler.

An assembly comprising a pressure tight plug and a coupler of a dry disconnect valve is also provided.

A method of sealing a coupler of a dry disconnect valve is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
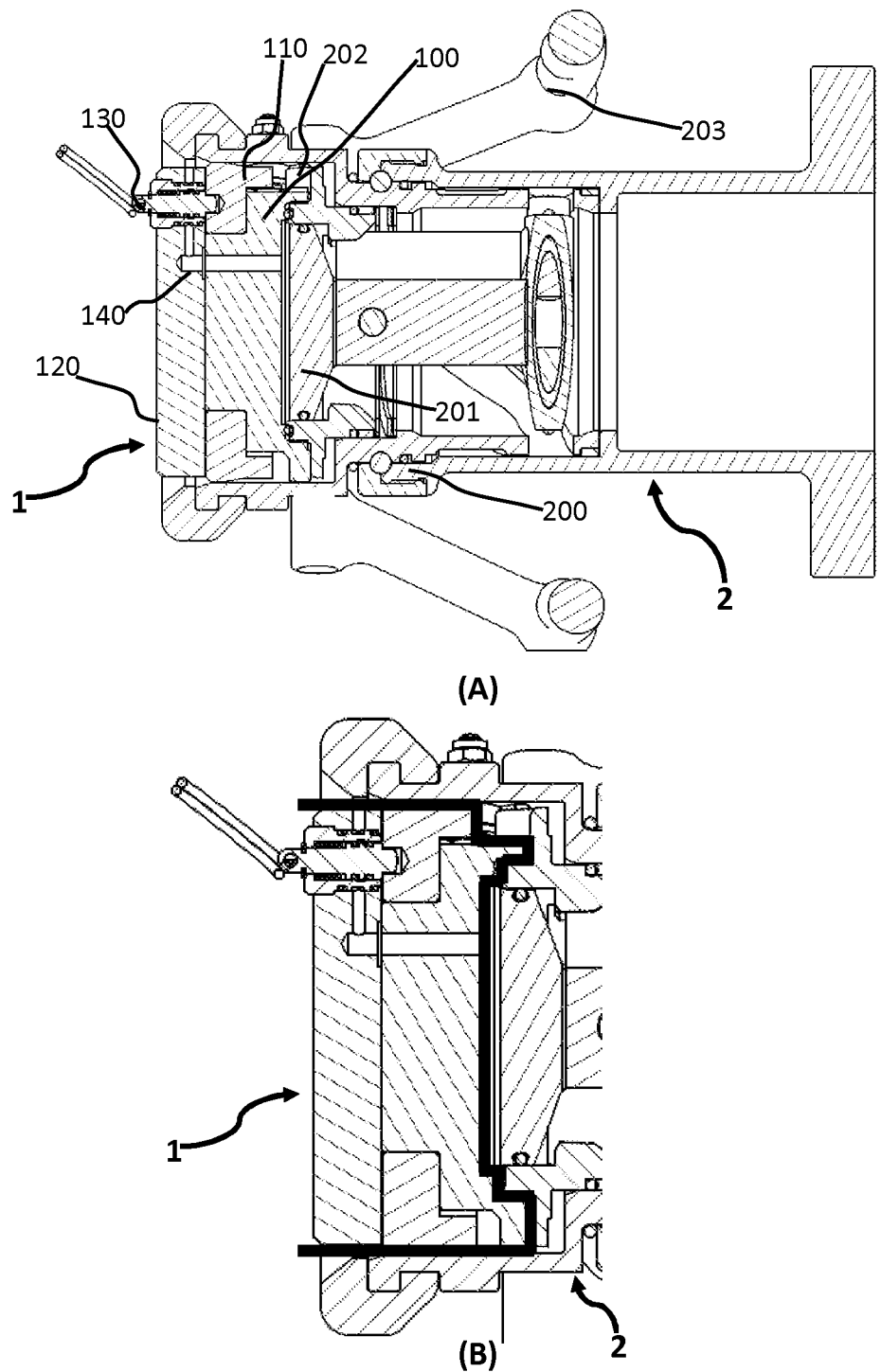
FIG. 1A is a cross sectional view of a pressure tight plug according to an aspect of the invention fixed to a coupler of a dry disconnect valve.
FIG. 1B is an enlarged view of a pressure tight plug fixed to a coupler where the interface between the coupler and the pressure tight plug is shown with a thick black line.
Figure 2:
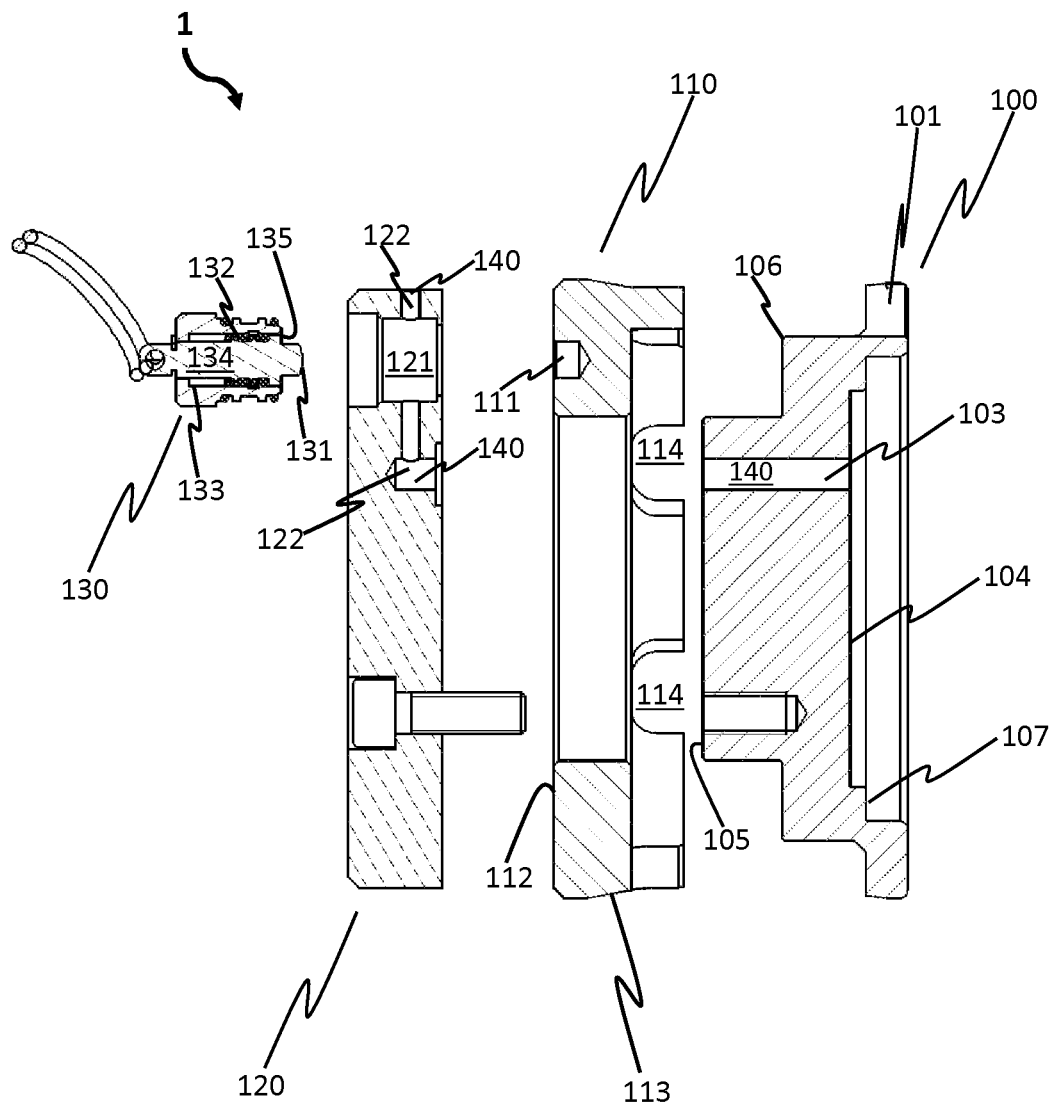
FIG. 2 is an exploded cross sectional view of a pressure tight plug according to an aspect of the invention.
Figure 3:
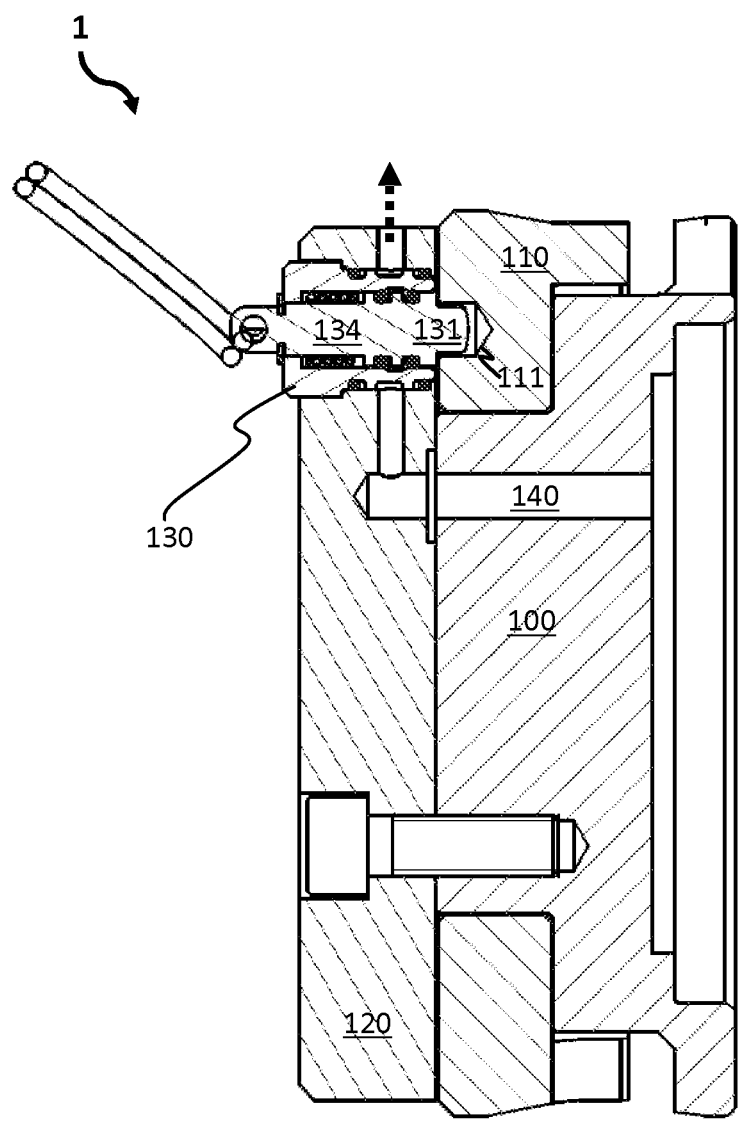
FIG. 3 is a cross sectional view of a assembled pressure tight plug according to an aspect of the invention.

FIG. 1 shows a pressure tight plug 1 for sealing a coupler 2 of a dry disconnect valve comprising a pressure relief lock valve 130. The pressure tight plug releasably and fluidically seals the coupler 2.

The plug 1 comprises a body 100, a locking ring 110 and a pressure relief lock valve 130. The plug 1 further comprises a pressure relief channel 140 extending from an internal region of the body 100, said region being arrangeable adjacent a main flow valve 201 of a coupler 2 of a dry disconnect valve, to atmosphere, via the pressure relief lock valve 130. The pressure relief lock valve 130 is arranged such that when the valve 130 is closed, and the pressure relief channel 140 is sealed, the pressure relief lock valve 130 restricts rotation of the locking ring 110. The plug 1 is thus held firmly in place on the coupler 2.

The pressure relief lock valve 130 engages with the locking ring 110 to restrict movement of the locking ring 110. The pressure relief lock valve 130 may restrict movement of the locking ring 110 in its valve 130 closed position. That is, when the pressure relief lock valve 130 seals the pressure relief lock channel 140 the locking ring 110 and the pressure relief lock valve 130 are engaged such that the locking ring 110 cannot rotate.

The body 100 engages with the coupler 2 such that the plug 1 is firmly held in place. The body 100 is provided with an flanged perimeter 101. The flanged perimeter 101 is for securing the body 100, and therein plug 1, to the coupler 2. The flanged perimeter 101 may form a continuous rigid flange which is receivable in the coupler 2. The flanged perimeter 101 may comprise at least one slot 102 for receiving at least one projection provided on the coupler 2. The flanged perimeter 101 may comprise, for example, a plurality, such as three slots 102, which are distributed substantially evenly around the circumference of the flanged perimeter 101.

The body 100 is provided with a through hole 103 forming a proximal region of a pressure relief channel 140. The through hole 103 may extend from a proximal face 104 of the body 100 to a distal face 105. The through hole 103 is continuous. The through hole 103 extends to the pressure relief lock valve 130. The through hole 103 may extend substantially perpendicular to the face of the main flow valve 201 of the coupler 2 of the dry disconnect valve.

The internal region of the body 100 is arrangeable adjacent to the main flow valve 201 of the coupler 2. The internal region of the body 100 protects the valve from damage. The internal region may be adapted to receive the valve of the coupler 2.

A circumferential internal face 107 of the body 100 seals against a region of the coupler 2 such that substantially fluid tight seal is formed. The fluid tight seal ensures that all fluid is maintained within the region of the body 100 comprising the through hole 103 and proximal region of the pressure relief channel 140. The circumferential internal face 107 may be provided on an internal circular recess in the body 100. This enables better sealing and protection of the components of the coupler 2 of the dry disconnect valve. The circumferential internal face 107 may be adapted to receive an O-ring provided on the coupler 2 for better sealing.

The body 100 comprises an external circumferential shoulder 106 forming a region for receiving the locking ring 110. The circumferential shoulder 106 may form a seat for receiving the locking ring 110.

Figure 4:
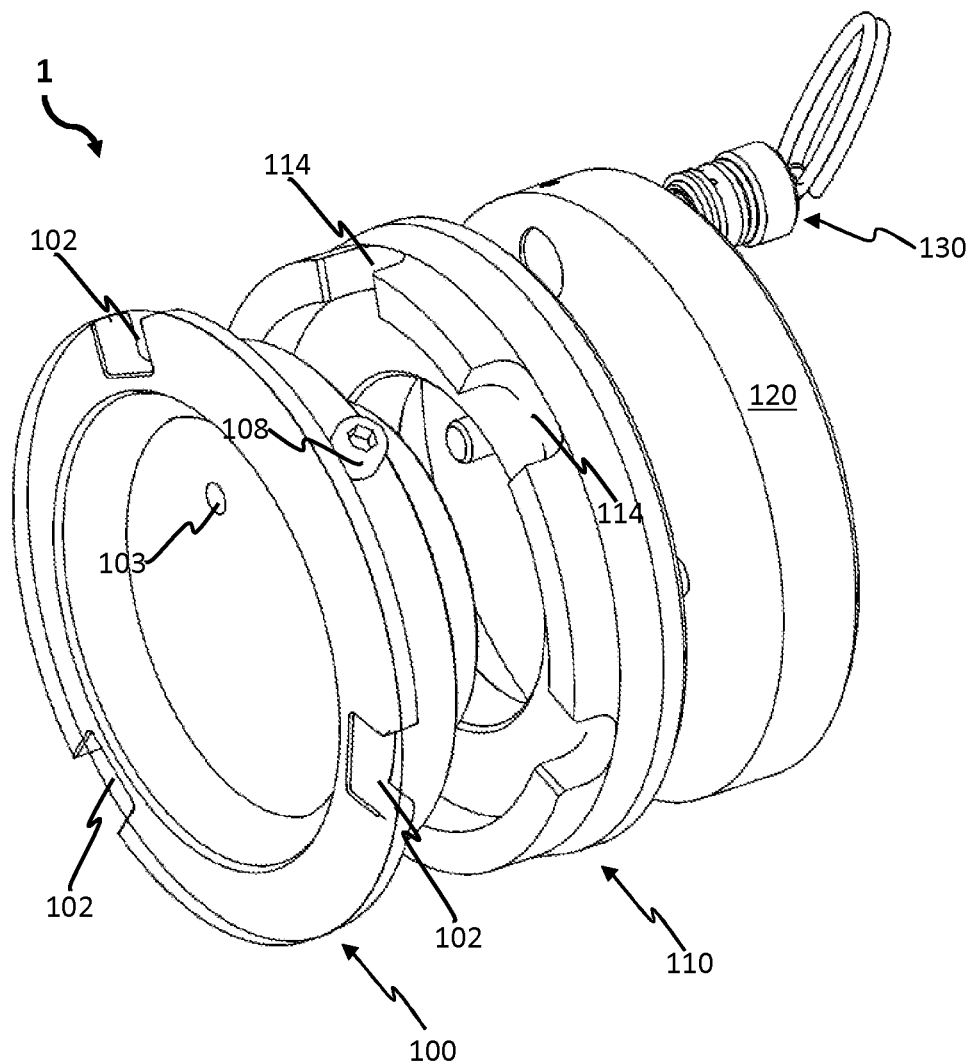
FIG. 4 is an exploded perspective view of a pressure tight plug according to an aspect of the invention.

As shown in FIG. 4 the body 100 may comprise a stop 108. The stop may be receivable in a slot 114 of the locking ring 110. The stop may be a projection from the external circumferential shoulder 106. The stop 108 engaging with the slot 114 on the locking ring 110 limits accidental rotational movement of the locking ring 110 if, for some reason, the pressure relief lock valve 130 were not to actuate to stop rotation.

The locking ring 110 is an annular ring member. The locking ring 110 generally forms a collar around the body 100. The locking ring 110 comprises a planar disc 112 comprising a central aperture. At the edge of the disc 112 a wall 113 extends perpendicular to the plane of the disc 112 forming the collar shape. The locking ring 110 may be rotatable with respect to the pressure relief lock valve 130. The locking ring 110 is receivable on the body 100. The locking ring 110 is rotatable with respect to the body 100. The locking ring 110 is provided with a recess 111 for receiving a projection 131 of the pressure relief lock valve 130. The locking ring 110 is rotated with respect to the pressure relief lock valve 130 via urging from male members on the coupler 2 of the dry disconnect valve. The locking ring 110 may be provided with at least one slot 114 for receiving and engaging with male member(s) provided on the coupler 2. The locking ring 110 may be provided with a plurality of slots 114, such as three or four slots 114, arranged substantially equally around the circumference of the locking ring 110. The at least one slot may be provided in the wall 113 of the locking ring 11. The at least one slot 114 may extend only partially in to the wall 113.

The coupler 2 is a coupler for a dry-disconnect valve. The coupler 2 may comprise a housing 200, a main flow valve 201 for restricting the flow of fluid through the coupler 2, and at least one projection 202. The main flow valve 201 is provided within the housing 200 of the coupler 2. The coupler 2 has a generally cylindrical form and has a central longitudinal axis extending through the center of the cylinder. The at least projection 202 is rotatable with respect to the housing 200 of the coupler 2. The projection 202 may be operationally and rotatably connected to a handle 203 of the coupler 2. Rotation of the handle 203 may therein impart a rotational force to the at least one projection 202.

The at least one projection 202 provided to the coupler 2 may be at least one urging member 202. An urging member 202 refers to a projection 202 from the coupler 2 which engages with at least the locking ring 110 and may impart a force on the locking ring 110 such that it rotates. The rotation of the at least one urging member 202 rotates the locking ring 110 with respect to the body 100, and the pressure relief lock valve 130. Generally, the urging member 202 is rotatable with respect to the housing 200 of the coupler 2. The urging member 202 may be provided on a rotatable portion of the coupler 2, in connection with the handle 203 of the coupler 2.

The at least one urging member 202 may be a roller. A roller is a projection 202 being fixed to a portion of the coupler 2 at a proximal end, extending radially outward from the central longitudinal axis of the coupler 2, and having a cylindrical rotatable element attached at a distal end. In general use, the rotatable element engages with the adapter of the dry-disconnect valve. In use with the pressure tight plug 1 the rotatable element engages with at least the locking ring 110.

To fix the pressure relief lock valve 130 with respect to the body 100, the pressure relief lock valve 130 may be provided in a face plate 120. The face plate 120 is a substantially flat circular member for sealing against the locking ring 110, the body 100, and the coupler 2 of the dry disconnect valve. The face plate 120 is provided with a recess 121 for receiving the pressure relief lock valve 130. The recess 121 may be provided in a distal face, facing outwards from the coupler 2 of the dry disconnect valve, of the face plate 120. The recess 121 may be threaded such that the pressure relief lock valve 130 can be held in place via a threaded interface. The engagement between the pressure relief lock valve 130 and the recess 121 should be fluid tight to ensure good sealing of the pressure relief channel 140.

The face plate 120 comprises a cavity 122 forming a distal region of the pressure relief channel 140. A first portion of the cavity 122 extends from a region arrangeable adjacent the through hole 103 of the body 100 to the recess 121 for the pressure relief lock valve 130. Such a portion may be considered to be internal the pressure relief lock valve 130. The cavity 122 comprises a second portion extending from the pressure relief lock valve 130 recess 121 to the outside of the face plate 120. That is, the second portion of the cavity is the portion connecting the pressure relief lock valve 130 to atmosphere. The cavity 122 extends external the pressure relief lock valve 130 to atmosphere.

In the arrangement described herein the pressure relief channel 140 extends from the proximal internal face 104 of the body 100 to atmosphere via the pressure relief lock valve 130. When the pressure tight plug 1 is in operation and arranged on a coupler 2 of a dry disconnect valve the pressure relief channel 140 extends from a region adjacent the main flow 201 valve of the coupler 2 to atmosphere, via the pressure relief lock valve 130.

The face plate 120, locking ring 110 and body 100 may be held together by a fixing element. The fixing element may fix the face plate 120 to the body 100 locating the locking ring 110 between the face plate 120 and body 100. This enables the locking ring 110 to be rotatable with respect to the face plate 120 and the body 100.

The pressure relief channel 140 is sealable via the pressure relief lock valve 130. The pressure relief lock valve 130 is fixed with respect to the body 100. That is, the lock valve 130 does not rotate with respect to the body 100. The pressure relief lock valve 130 is rotatable with respect to the locking ring 110.

As shown in FIG. 1 the pressure valve 130 may be receivable in the face plate 120. The pressure relief lock valve 130 comprises a projection 131 at the end of a valve member 134. The projection 131 may be integral with the valve member 134. This results in improved locking and sealing performance of the plug 1. The valve member 134 may be a shaft. The pressure relief lock valve further comprises a biasing means 132, and a housing 133. The biasing means 132 urges the valve 130 and valve member 134 closed. At least one through hole may be provided through the housing 133 of the lock valve 130 such that fluid can pass from the pressure relief channel 140 in to the internal region of the lock valve 130. The pressure relief lock valve 130 is closed when the valve member 134 seals against an internal wall of the housing 133. The valve member 134 may comprise at least one collar 135 annular to the valve member 134. The at least one collar 135 may seal against an internal wall of the housing 133. In a valve closed position the at least one collar 135 may seal the at least one through hole in the housing 133 such that the valve is closed. In a valve 130 open position the through hole is open to atmosphere via the cavity 122.

When the pressure valve 130 is received in the face plate 120 the biasing means 132 urges the projection 131 towards the locking ring 110. The projection 131 is receivable in the recess 111 of the locking ring 110. With the projection 131 received in the recess of the locking ring 110 the locking ring is locked in place and cannot rotate with respect to the projection 131, and therein, the pressure relief lock valve 130, the face plate 120 and the body 100. The valve member 134 and the projection 131 are designed such that when the projection 131 is received in the recess 111 of the locking ring 110 the pressure relief lock valve 130 is closed.

The pressure relief lock valve 130 can be opened by urging the valve member 134 against the biasing means 132. This allows pressure built up on the internal side of the pressure relief lock valve 130 to be released to the external side of the pressure relief lock valve 130. Simultaneously the projection 131 is withdrawn from the recess 111 of the locking ring 110. The locking ring 110 can therefore be rotated with respect to the pressure relief lock valve 130, the face plate 120, and the body 100. Opening of the pressure relief lock valve 130 may be performed manually by an operator applying a force to the valve member 134. To ease the application of force against the biasing means 132 the pressure relief lock valve 130 may be provided with a means of gripping the valve member 134 such as, as shown in FIGS. 1 to 4, a ring. The pressure relief locking valve may be opened by a lever acting on the pressure relief valve member 134. A lever may be advantageous as the force acting at the valve member 134 may be increased with respect to the force applied to the lever.

The operation of the pressure tight plug 1 will now be described. The operation will be described with reference to a coupler 2 of a dry disconnect valve.

The pressure tight plug 1 protects the coupler 2 of a dry disconnect valve from damage 1 and provides a locking pressure release function which means that the plug cannot be released from the coupler 2 without first releasing any pressure build up.

The plug 1 is receivable on the coupler 2 of a dry disconnect valve. The plug 1 takes the place of an adapter in a traditional coupler-adapter dry disconnect valve assembly. The body 100 is received inside a sleeve of the coupler 2 such that the proximal face 104 of the body 100 is adjacent to the main flow valve 201 of the coupler 2. In a starting position, prior to sealing the pressure tight plug 1 to the coupler 2, the pressure relief lock valve 130 is in an open position. In a starting position the projection 131 of the pressure relief lock valve is not received in the recess 111 of the locking ring 110. In an open position, the projection 131 is not aligned coaxially with the recess 111.

On fitting of the pressure tight plug 1 to the coupler 2, at least one projection present on the coupler 2 may extend through the at least one slot provided on the body 100. The at least one projection present on the coupler 2 may extend and engage with the at least one slot 112 on the locking ring 110. The flanged perimeter 101 of the body 100 may, on insertion of the plug 1 to the coupler 2 depress locking members of the coupler 2 which restrict rotation of the coupler 2 without the presence of the plug 1, or an adapter.

Rotating handle(s) 203 present on the coupler 2 will rotate the projections and thus rotate the locking ring 110 with respect to the pressure relief lock valve 130 and the projection 131. Rotating the handle(s) 203 on the coupler 2 generally results in opening of the main flow valve 201. The coupler 2 for use with the pressure tight plug 1 disclosed herein may be provided with a rotatable portion during which the handle(s) 203 and the at least one projection 202 present on the coupler 2 may rotate, but during which the main flow valve 201 is not actuated. The rotatable portion may be a rotation of from about 5° to about 25°, such as about from about 10° to 15°. When the locking ring 110 has rotated a predetermined amount the pressure relief lock valve 130, and the projection 131 thereof, become aligned coaxially with the recess 111 in the locking ring 110. The projection 131 is urged by the biasing means 132 in to the recess 111 which locks the locking ring 110 in place such that it cannot be rotated further. Rotating of handle(s) 203 of the coupler 2 is thus restricted by the projection 131 being inserted in to the recess 111. As the handle(s) 203 cannot be rotated further the main flow valve 201 cannot be opened. The pressure tight plug 1 has now sealed the coupler 2.

If, for any reason, pressure was to build up between the main flow valve 201 of the coupler 2 and the pressure relief lock valve 130, this must be released prior to the pressure tight plug 1 being released from the coupler 2. Pressure may build up on the internal side of the pressure relief channel 140. If the pressure was not released prior to release of the plug 1, the plug 1 could be forced by the pressure towards an operator. To release the possible pressure build up the pressure relief lock valve 130 must be opened. The pressure relief lock valve 130 may be opened by urging the valve member 134 against the biasing direction thus opening the valve 130 and simultaneously removing the projection 131 from the recess 111. Opening the pressure relief lock valve 130, opens the pressure relief channel 140 to atmosphere. The valve member 132 is arranged such that as any pressure build up is released prior to the projection 131 being entirely removed from the recess 111. In such an arrangement a safe release of pressure occurs prior to the unlocking of the locking ring 111 with respect to the face plate 120 and body 100.

After the unlocking of the locking ring 110, the handle(s) 203 of the coupler 2 may be turned in the direction for releasing the pressure tight plug 1. The pressure tight plug 1 can thereafter be removed from the coupler 2.

Dry disconnect valves are generally used for the transfer of fluid and as such the plug 1 shall be fluid tight to prevent the leakage of fluid. However, the plug 1 shall also be capable of withstanding the general operating pressures such as from about 16 bar to about 40 bar. During a burst incident the pressure at the plug 1 may be at least five times the working pressure such as from about 80 bar to about 200 bar. The pressure tight plug 1 may be adapted to withstand such pressures without releasing from the coupler 2. It may be noted that the volume of fluid in the pressure relief channel 140 is inherently small as the pressure relief channel is of limited dimension. Therefore, the volume of fluid at even a high pressure is quite small and may be released by opening the pressure relief lock valve 130.

As described above the pressure relief lock valve 130 may comprise the projection 131 which is receivable in the recess 111 of the locking ring 110. It also conceivable that instead of the pressure relief lock valve 130 the locking ring 110 is provided with the projection 131 and the pressure relief lock valve 130 is provided with the recess 111. However, providing the projection 131 on the pressure relief lock valve 130 results in a simplified and reliable design of the lock valve 130.

The main flow valve 201 of the coupler 2 for use with the plug 1 described herein may be a valve comprising a valve head with a substantially flat face, a stem, and a connecting region connecting the substantially flat face of the head to the stem.

The pressure tight plug 1 as described herein could further comprises means for attaching the pressure tight plug to a fixed object. Such arrangement would enable the pressure tight plug to be used as a fixture for holding a coupling and thus a hose that are not currently in use. The pressure tight plug 1 could be arranged as a parking spot for the coupling and thereby the hose. The means for attaching the pressure tight plug to a fixture or fixed object could for example be openings arranged to receive screws or brackets comprising any form of attachment means for securing the pressure tight plug 1 to an object.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A pressure tight plug for releasably sealing a coupler of a dry disconnect valve, the coupler comprising a housing, a main flow valve, and at least one urging member being rotatable with respect to the housing of the coupler, the pressure tight plug comprising:
    a body comprising: an internal region for sealing adjacent the main flow valve of the coupler, and a flanged perimeter for securing the plug to the coupler,
    a locking ring receivable on, and rotatable with respect to the body via the at least one urging member of the coupler,
    a pressure relief lock valve for releasably engaging the locking ring, the pressure relief lock valve rotatably fixed with respect to the body, and
    a pressure relief channel extending from the internal region of the body to atmosphere, via said pressure relief lock valve;
    the pressure relief lock valve being arranged such that in a valve closed position the pressure relief lock valve is engaged with the locking ring restricting movement of the locking ring, and therein fixing the plug to the coupler and releasably sealing the coupler.

2. The pressure tight plug according to claim 1, wherein the locking ring or the pressure relief lock valve comprises a recess, and wherein the pressure relief lock valve or the locking ring comprises a projection being receivable in the recess, and wherein, in a valve closed position the projection is received in the recess.

3. The pressure tight plug according to claim 2, wherein on opening the pressure relief lock valve the projection is withdrawn from the recess enabling rotation of the locking ring and thereafter release of the plug from the coupler.

4. The pressure tight plug according to claim 3, wherein the locking ring is provided with at least one slot for receiving an urging member of the coupler.

5. The pressure tight plug according to claim 3, wherein the flanged perimeter of the body is provided with at least one slot for receiving an urging member of the coupler.

6. The pressure tight plug according to claim 3, wherein a spring biases the pressure relief lock valve toward a closed position.

7. The pressure tight plug according to claim 2, wherein the projection and a valve member are integral.

8. The pressure tight plug according to claim 2, wherein the locking ring is provided with at least one slot for receiving an urging member of the coupler.

9. The pressure tight plug according to claim 2, wherein the flanged perimeter of the body is provided with at least one slot for receiving an urging member of the coupler.

10. The pressure tight plug according to claim 2, wherein a spring biases the pressure relief lock valve toward a closed position.

11. The pressure tight plug according to claim 1, wherein the locking ring is provided with at least one slot for receiving an urging member of the coupler.

12. The pressure tight plug according to claim 11, wherein the flanged perimeter of the body is provided with at least one slot for receiving an urging member of the coupler.

13. The pressure tight plug according to claim 1, wherein the flanged perimeter of the body is provided with at least one slot for receiving an urging member of the coupler.

14. The pressure tight plug according to claim 1, wherein a spring biases the pressure relief lock valve toward a closed position.

15. The pressure tight plug according to claim 1, wherein the locking ring is rotatable by a plurality of urging members provided on the coupler.

16. The pressure tight plug according to claim 1, wherein the pressure tight plug comprises means for attaching the pressure tight plug to a fixed object.

17. An assembly comprising:
    a coupler of a dry disconnect valve; and
    the pressure tight plug according to claim 1, for releasably sealing the coupler.

18. The assembly according to claim 17, wherein the coupler comprises:
    a plurality of urging members, wherein said urging members engage with the locking ring to enable rotation of the locking ring with respect to the housing of the coupler.

19. A method for sealing a coupler of a dry disconnect valve comprising:
- providing the pressure tight plug according to claim 1 to the coupler,
- rotating the locking ring with respect to the pressure relief lock valve via rotating a handle provided on the coupler, the rotation of the handle rotating the at least one urging member of the coupler thereby rotating the locking ring and thereby sealing the pressure tight plug against the coupler, and
- engaging the pressure relief lock valve to the locking ring thereby restricting the locking ring and handle from further rotation and fixing the plug to the coupler.

20. The method according to claim 19, wherein the locking ring or the pressure relief lock valve comprises a recess, and wherein the pressure relief lock valve or the locking ring comprises a projection being receivable in the recess, and wherein, in a valve closed position the projection is received in the recess.

* * * * *